(12) United States Patent
Pittelko et al.

(10) Patent No.: US 9,916,101 B2
(45) Date of Patent: Mar. 13, 2018

(54) SYSTEMS AND METHODS FOR REPLICATION OF DATA UTILIZING DELTA VOLUMES

(71) Applicant: Compellent Technologies, Eden Prairie, MN (US)

(72) Inventors: Michael H. Pittelko, Chaska, MN (US); Mark David Olson, Longmont, CO (US)

(73) Assignee: Dell International L.L.C., Round Rock, TX (US)

( * ) Notice: Subject to any disclaimer, the term of this patent is extended or adjusted under 35 U.S.C. 154(b) by 48 days.

(21) Appl. No.: 14/740,406

(22) Filed: Jun. 16, 2015

(65) Prior Publication Data

US 2015/0277800 A1    Oct. 1, 2015

Related U.S. Application Data

(63) Continuation of application No. 13/550,152, filed on Jul. 16, 2012, now Pat. No. 9,087,009.

(51) Int. Cl.
| | |
|---|---|
| *G06F 12/00* | (2006.01) |
| *G06F 3/06* | (2006.01) |
| *G06F 11/14* | (2006.01) |
| *G06F 11/20* | (2006.01) |

(52) U.S. Cl.
CPC .......... *G06F 3/0619* (2013.01); *G06F 3/0665* (2013.01); *G06F 3/0689* (2013.01); *G06F 11/1451* (2013.01); *G06F 11/1456* (2013.01); *G06F 11/1464* (2013.01); *G06F 11/2071* (2013.01); *G06F 11/2074* (2013.01); *G06F 2003/0692* (2013.01); *G06F 2201/84* (2013.01)

(58) Field of Classification Search
None
See application file for complete search history.

(56) References Cited

U.S. PATENT DOCUMENTS 7,567,991 B2 *   7/2009   Armangau .......... G06F 11/1435
7,613,945 B2    11/2009   Soran et al.
(Continued)

OTHER PUBLICATIONS

International Search Report and Written Opinion for related PCT Application PCT/US2013/045067 dated Dec. 20, 2013 (7 pages).

*Primary Examiner* — Brian R Peugh
(74) *Attorney, Agent, or Firm* — Winthrop & Weinstine, P.A.

(57) ABSTRACT

A method of data replication from a first data storage device to a second data storage device. The method may include generating, at the first data storage device, at spaced time intervals, a plurality of snapshots for a logical data volume of the first data storage device, the logical data volume being an abstraction of data blocks from one or more physical storage devices, each snapshot identifying changes of data for at least a portion of the logical data volume since a most previous snapshot. Also at the first data storage device, the method includes generating a delta volume, the delta volume indicating changes in the data of at least a portion of the logical data volume between two non-consecutive snapshots. The method further involves replicating the delta volume to the second data storage device, and replicating the changes to the data indicated therein at the second data storage device.

18 Claims, 5 Drawing Sheets

(56) References Cited

U.S. PATENT DOCUMENTS

| | | | |
|---|---|---|---|
| 8,429,360 B1* | 4/2013 | Iyer | G06F 17/30581 |
| | | | 707/639 |
| 2004/0098424 A1* | 5/2004 | Seidenberg | G06F 17/30067 |
| 2007/0136389 A1 | 6/2007 | Bergant et al. | |
| 2009/0055608 A1 | 2/2009 | Yamasaki | |
| 2009/0276593 A1 | 11/2009 | Jacobson et al. | |
| 2011/0191560 A1 | 8/2011 | Zhu | |
| 2012/0110287 A1 | 5/2012 | Han et al. | |
| 2012/0124307 A1 | 5/2012 | Ashutosh et al. | |
| 2013/0080720 A1* | 3/2013 | Nakamura | G06F 17/30088 |
| | | | 711/161 |

* cited by examiner

SYSTEMS AND METHODS FOR REPLICATION OF DATA UTILIZING DELTA VOLUMES

CROSS REFERENCE TO RELATED APPLICATIONS

This application is a continuation of U.S. patent application Ser. No. 13/550,152, now U.S. Pat. No. 9,087,009 titled "Systems and Methods for Replication of Data Utilizing Delta Volumes," filed Jul. 16, 2012, the disclosure of which is hereby incorporated by reference herein in its entirety.

FIELD OF THE INVENTION

The present disclosure generally relates to systems and methods for replication of, for example, backup or historical data. Particularly, the present disclosure relates to replication processes for data utilizing delta volumes.

BACKGROUND OF THE INVENTION

Data storage on disk has been rapidly outgrowing typical means to back up data on those disks to removable storage, such as tape. At the same time, the need to provide cost effective backup copies has grown out of, for example, practical needs and trade and federal rules/legislation.

A single and simple remote replication target site may suffice for storing historical data. However, the cost to maintain every snapshot taken at the source site at the remote site could be prohibitive. Items contributing to the costs, include but are not limited to: the opportunity cost of the bandwidth used; the real dollar cost of the bandwidth; the real dollar cost of the remote site, including for example, the size of the site, the power required to operate the site, the employee cost for the site, etc.; the administrative cost for replication; and the storage cost, including the cost of the disk drives or other block store devices.

Conventional methods of replicating data to a backup storage can result in extra, unnecessary data being transferred between the source site and backup site. For example, in one example method of replicating data, consider a data storage system 100 having local storage 102 and backup or remote storage 104, as illustrated in FIG. 1. At local storage 102, which maintains active data input/output (I/O), the system is configured for local recovery snapshots at 8 hour intervals, i.e., snapshots 106, 108, 110, and 112. Each snapshot identifies the changes or delta between it and the prior snapshot. For example, snapshot 108 identifies only the changes since snapshot 106 was taken, or from 12 am to 8 am. In contrast, the backup storage 104 may, for example, be configured for only nightly backup, i.e., backup once every 24 hours, as a lengthier backup interval period for the backup data may be sufficient and more efficient in overall storage use at the backup site because the data is less active or inactive. Regardless of the 24 hour backup period at the backup storage 104, however, because the snapshots at the local storage identify only the deltas between each snapshot, in the course of a day, each snapshot will nonetheless be at least temporarily replicated to the backup storage, as illustrated in FIG. 1, in order for the backup storage system to identify the entire day's changes and appropriately create the 24-hour daily backup. To save space, any intermediate backups 114, 116 can be deleted once the 24 hour backup 118 is committed. Nonetheless, assuming an example 10 terabyte (TB) dataset and a worst case scenario where 100% of the dataset changes every 8 hours at the local storage, such conventional method would require the entire 10 TB to be transferred to the backup storage 104 every 8 hours, resulting in a total daily transfer of 30 TB.

In the above example, only 24 hour snapshots 118 and 120 are of interest, and if intermediate snapshots 112, 114 could be eliminated, even in the worst case scenario, the daily transfer of data from the local storage 102 to the backup storage 104 would be reduced from 30 TB to 10 TB. The problem may increase even more where, for example only, the dataset is much larger than 30 TB, where the local storage takes snapshots at intervals shorter than 8 hours, and/or where the backup storage takes backups at larger intervals than 1 day. However, it is recognized that systems where the dataset is much smaller than 30 TB, where the local storage takes snapshots at intervals longer than 8 hours, and/or where the backup storage takes backups at smaller intervals than 1 day would likely have the same issues.

Thus, there is a need in the art for providing more cost effective and/or more efficient replication processes for, for example, backup or historical data.

BRIEF SUMMARY OF THE INVENTION

The present disclosure, in one embodiment, relates to a method of data replication from a first data storage device to a second data storage device. The method may include generating, at the first data storage device, at spaced time intervals, a plurality of snapshots for a logical data volume of the first data storage device, the logical data volume being an abstraction of data blocks from one or more physical storage devices, and each snapshot identifying changes of data for at least a portion of the logical data volume since a most previous snapshot. In some embodiments, the spaced time intervals are predetermined time intervals. Also at the first data storage device, the method includes generating a delta volume, the delta volume indicating changes in the data of at least a portion of the logical data volume between two non-consecutive snapshots. The method further involves replicating the delta volume to the second data storage device, and replicating the changes to the data indicated therein at the second data storage device. The delta volume at the first storage device may be discarded after being replicated to the second data storage device. The method may further include generating a plurality of delta volumes at spaced time intervals.

In even further embodiments, the method may involve generating a combined delta volume, the combined delta volume indicating changes in data of at least a portion of the logical data volume between two non-consecutive delta volumes. A plurality of such combined delta volumes may also be generated at spaced time intervals. Similarly, a combined delta volume may be replicated to a third data storage device, and the changes to the data indicated therein may be thus replicated at the third data storage device.

The present disclosure, in another embodiment, also relates to a method of data replication from a first data storage device to a second data storage device. The method may include receiving a delta volume at the second data storage device, the delta volume indicating the changes in data of at least a portion of a logical data volume of the first data storage device, and replicating the changes to the data indicated therein at the second data storage device. In this regard, the first data storage device may generate a plurality of snapshots for the logical data volume, the logical data volume being an abstraction of data blocks from one or more physical storage devices, with each snapshot identifying changes of data for at least a portion of the logical data volume since a most previous snapshot. The delta volume may thus indicate changes in data of at least a portion of the logical data volume between two non-consecutive snapshots.

The present disclosure, in yet another embodiment, relates to a delta volume for a data storage system, the delta volume comprising an indication of changes in data between two non-consecutive snapshots of the data storage system, with each snapshot identifying changes of data for at least a portion of the data storage system since a most previous snapshot. Each snapshot may identify changes of data for a logical volume of the data storage system since a most previous snapshot.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

The present disclosure relates to novel and advantageous systems and methods for replication of, for example, backup or historical data. Particularly, the present disclosure relates to novel and advantageous systems and methods for replication of data utilizing delta volumes.

The systems and methods of the present disclosure may be particularly useful in the context of a disk drive system, or virtual disk drive system, such as that described in U.S. Pat. No. 7,613,945, titled "Virtual Disk Drive System and Method," issued Nov. 3, 2009, the entirety of which is hereby incorporated herein by reference. Such disk drive systems allow the efficient storage of data by dynamically allocating the data across a page pool of storage, or a matrix of disk storage blocks, and a plurality of disk drives based on RAID-to-disk mapping. They may protect data from, for example, system failures or virus attacks by automatically generating and storing snapshots or point-in-time copies of the system or matrix of disk storage blocks at, for example, predetermined time intervals, user configured dynamic time stamps, such as, every few minutes or hours, etc., or at times directed by the server. These time-stamped snapshots permit the recovery of data from a previous point in time prior to the system failure, thereby restoring the system as it existed at that time. These snapshots or point-in-time data may also be used by the system or system users for other purposes, such as but not limited to, testing, while the main storage can remain operational. Generally, using snapshot capabilities, a user may view the state of a storage system as it existed in a prior point in time.

Figure 2:
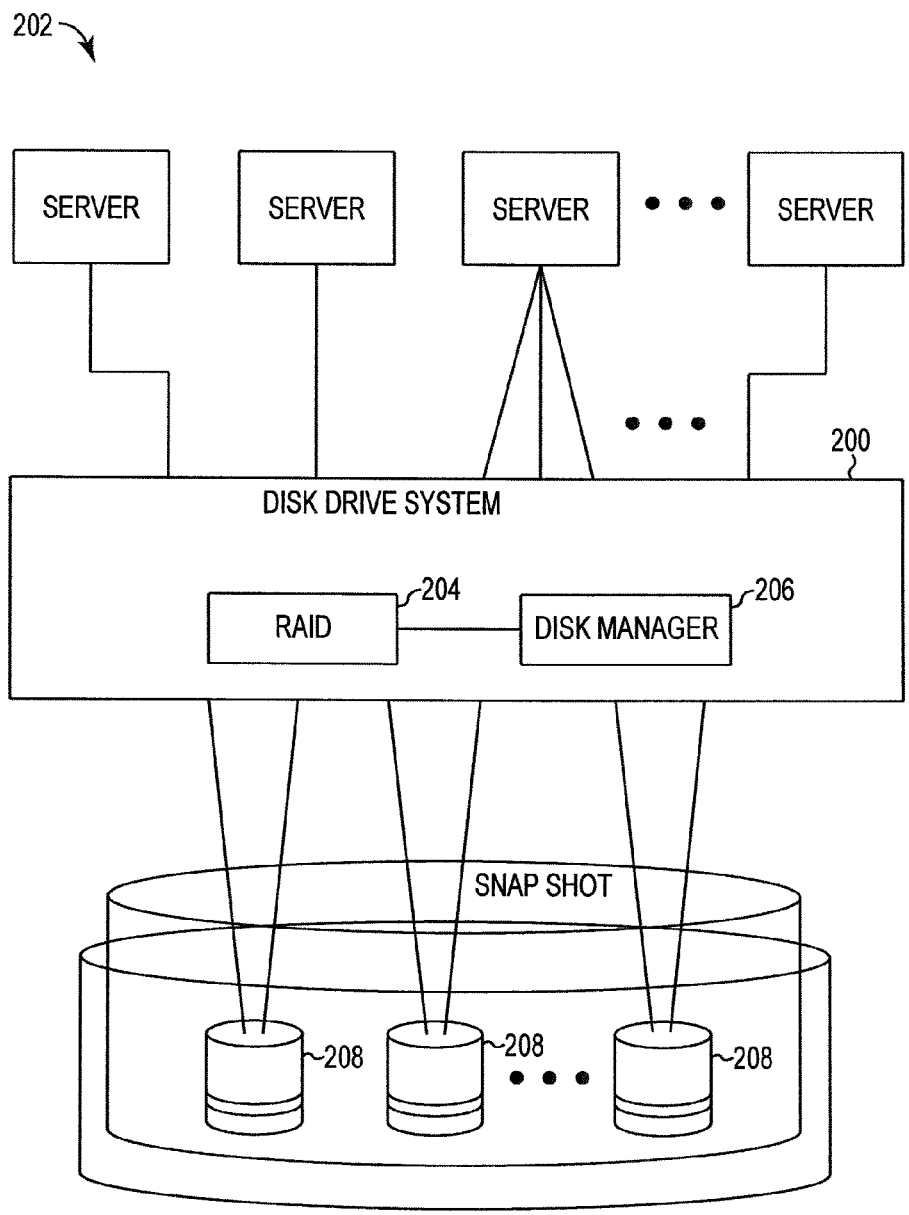
FIG. 2 is a schematic of a disk drive system suitable with the various embodiments of the present disclosure.

FIG. 2 illustrates one embodiment of a disk drive or data storage system 200 in a computer environment 202, such as that disclosed in U.S. Pat. No. 7,613,945, and suitable with the various embodiments of the present disclosure. As shown in FIG. 2, the disk drive system 200 may include a data storage subsystem 204, which may include a RAID subsystem, as will be appreciated by those skilled in the art, and a disk manager 206 having at least one disk storage system controller. The data storage subsystem 204 and disk manager 206 can dynamically allocate data across disk space of a plurality of disk drives 208 based on, for example, RAID-to-disk mapping or other storage mapping technique.

As generally described above, the data storage system 204 may automatically generate a snapshot(s) or Point-in-Time Copy(ies) (PITC) of the system, or a matrix of disk storage blocks or volume(s) thereof. A snapshot may include a record of write operations to, for example, a volume so that a "view" may subsequently be created to see the contents of the volume as they existed in the past, such as for data recovery. A Logical Block Address (LBA) remapping layer may be added to a data path within the virtualization layer, and may therefore provide another layer of virtual LBA mapping within the I/O path. The snapshot or PITC need not copy all volume information, and instead, in some embodiments, may merely modify a table that the remapping layer uses. Snapshot capabilities of the data storage system 204 may include, but are not limited to, creating snapshots, managing snapshots, coalescing snapshots, and controlling I/O operations of the snapshots.

Figure 3:
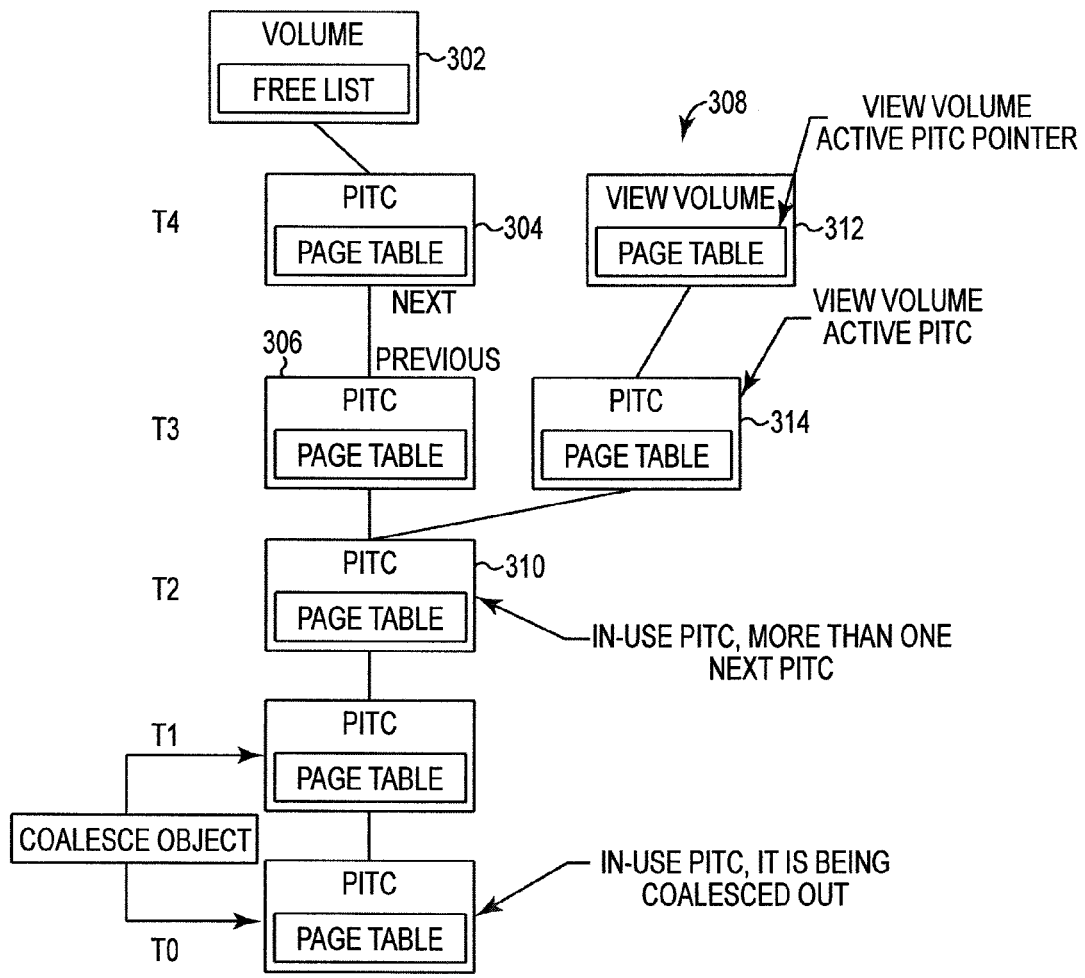
FIG. 3 is a schematic of snapshot scheme according to one embodiment of the present disclosure.

FIG. 3 illustrates one embodiment of a snapshot scheme, as described in U.S. Pat. No. 7,613,945. As illustrated in FIG. 3, a top-level snapshot or PITC for a volume, or a view volume as will be described below, may be an active snapshot or PITC (AP) 302. The AP 302 may satisfy all read and write requests to the volume. In many embodiments, the AP is the only snapshot or PITC for the volume that may accept write requests. The AP 302 may contain a summary of data page pointers for the entire volume.

The next snapshot level down from the AP 302 may be the most recently active snapshot or PITC that is no longer active. In the embodiment shown, the snapshot 304 was taken or committed at time T4. The next most recent snapshot or PITC 306 was taken or committed at time T3. The pattern may continue for snapshots or PITCs taken at times T2, T1, and T0. The number of snapshots or PITCs shown in FIG. 3 are for illustration purposes only. Of course, there could be fewer or many more snapshots than that shown.

FIG. 3 also illustrates that a view volume 308 may subsequently be created to see or view the contents of a volume as they were at some point in the past. In general, view volumes provide access to previous points-in-time and can support normal volume I/O operations. A view volume PITC may track the difference between the original PITC from which the view volume was generated, and the view volume allows the user to access the information contained within the original PITC without modifying the underlying data of the original PITC. In this sense, a view volume branches from the PITC from which it was generated and may support such actions as, but not limited to, recovery, test, backup operations, etc. In the example shown, the view volume 308 may be created from snapshot or PITC 310, which was taken at T2. Thus, the view volume 308 provides a view of the volume as it was at time T2. The view volume may initially be an active snapshot or PITC and may satisfy all read and write requests to the view volume. However, a view volume 308 may also take advantage of snapshot capabilities and have snapshots or PITCs of its own similarly generated at predetermined time intervals, user configured dynamic time stamps, such as, every few minutes or hours, etc., or at times directed by the server. In this regard, the view volume may include an active PITC 310 and one or more snapshots or PITCs, e.g., 312, that were generated at previous points in time. In many embodiments, the active PITC for the view volume is the only snapshot or PITC for the view volume that may accept write requests.

During a basic life cycle of a snapshot or PITC, the snapshot or PITC may go through a number of following states before it is committed as read-only:

1. Create page table—Upon creation of the PITC, a page table may be created.

2. Commit space for PITC to disk—This generates the storage on the disk for the PITC. By writing the table at this point, it may ensure that the required space to store the table information is allocated before the PITC is taken. At the same time, the PITC object may also committed to the disk.

3. Accept I/O—As the AP, it may now handle read and write requests for the volume. In many embodiments, this is the only state that accepts write requests to the table.

4. Commit PITC table to disk as read-only—The PITC is no longer the AP, and no longer accepts additional pages. A new AP has taken over. In some embodiments, the table will no longer change unless it is removed during a coalesce operation with one or more other snapshots or PITCs. In this sense, it is read-only.

5. Release table memory—Frees any extra memory that the table required in order to release available resources.

Figure 1:
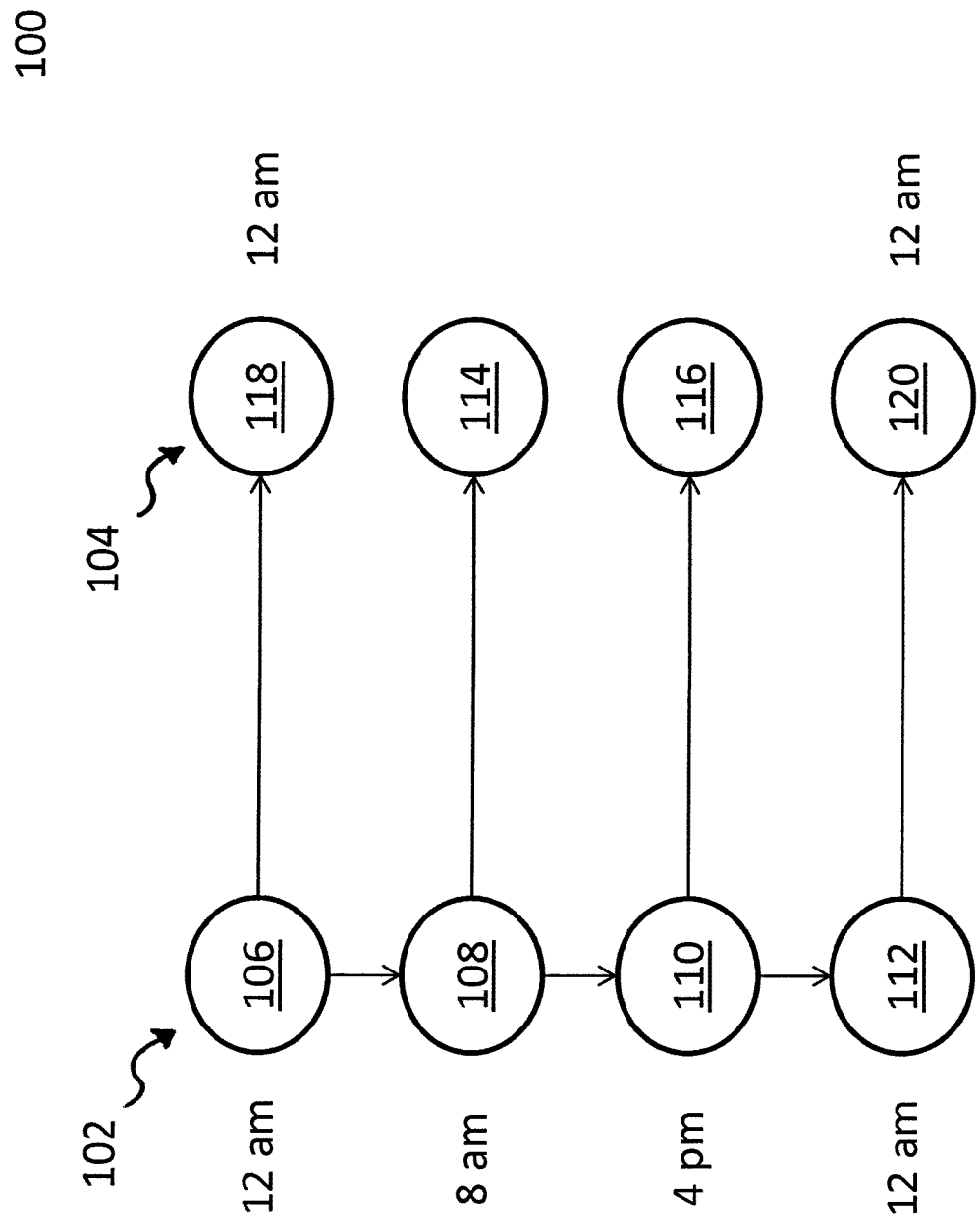
FIG. 1 is a schematic of a conventional replication process from local to backup storage.

As described above, conventional methods of replicating data to backup storage can result in extra, unnecessary data being transferred between the source site and backup site. For example, in the example method illustrated in FIG. 1, each and every snapshot will nonetheless be, at least temporarily, replicated to the backup site.

The present disclosure improves snapshot and replication processes for historical data in a data storage system, such as but not limited to the type of data storage system described in U.S. Pat. No. 7,613,945. The disclosed improvements can provide more cost effective and/or more efficient replication processes for, by way of example, backup or historical data.

Figure 4:
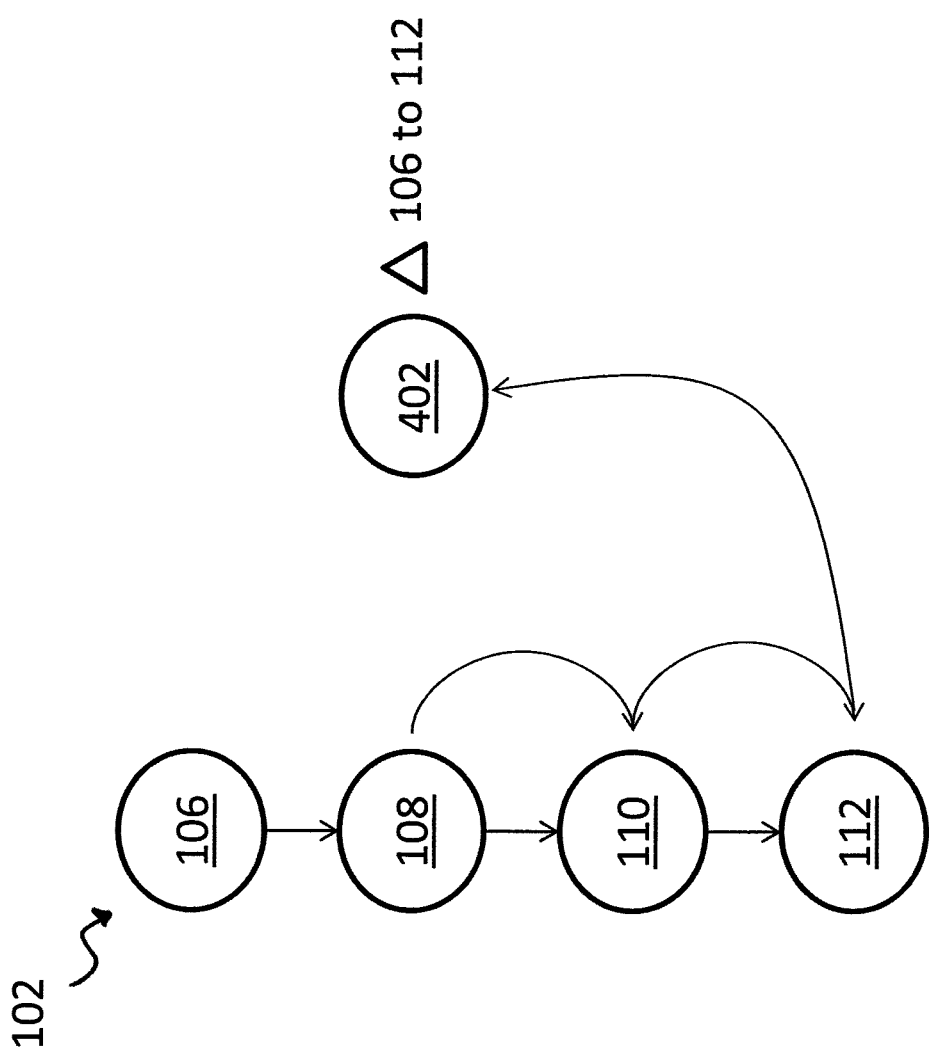
FIG. 4 is a schematic of a delta volume according to one embodiment of the present disclosure.

In embodiments of the present disclosure, each snapshot or PITC may be represented or understood as identifying the changes or delta between it and the prior snapshot or PITC, or some previous consecutive point in time. Generally, as will be described in more detail below, in addition to utilizing consecutive snapshots, as discussed with respect to FIG. 1, a delta volume 402, illustrated in FIG. 4, may be created at the local storage 102 that identifies the changes or delta between two non-consecutive snapshots or PITCs, such as between snapshots 106 and 112. In one embodiment, a delta volume may be created by coalescing a snapshot at the desired end point in time (e.g., snapshot 112) with any intermediate snapshots (e.g., snapshots 108, 110) between an initial point in time (e.g., snapshot 106) and the endpoint snapshot to form or create a single volume identifying the changes between data at the initial point in time and the desired end point in time. In this regard, in one embodiment, a delta volume may contain data relating to just the changes to the data of a volume between two arbitrary or non-consecutive snapshots or PITCs. A delta volume may be an abstraction of the data, identifying the changes in data over time, but may not store the actual data. Accordingly, between snapshots/PITCs and delta volumes, a manner is provided to relatively easily provide a view of the change or delta in data between any two desirable points in time. The delta volume also provides a means for local-to-backup replication without the potential of unnecessarily copying unchanged or irrelevant data deltas in the process. In this regard, the delta volume 402 may be relatively simply copied or sent to the backup storage 104 to establish a backup at desired backup intervals without requiring the replication of intermediate snapshots, e.g., 112, 114. If desired, the delta volume could then be discarded by the source or initiating site to release the storage space temporarily utilized by the delta volume.

In some embodiments, a delta volume could return relatively highly compressible data, such as zeros for example, for unchanged data blocks, thereby permitting the delta volume to be backed up very efficiently utilizing traditional backup software tools. A restoration software tool could be used to restore an original volume from such traditionally backed up delta volumes by recombining them the delta volumes, and could do so while preserving snapshot hierarchies.

As an example, the various embodiments of the present disclosure permit the use of relatively frequent non-replicating snapshots or PITCs, during, for example, active times when frequent local backup may be desired, and the use of delta volumes at relatively sparse intervals for larger or remote backups of historical data. And, while in a broad sense, a delta volume may be considered as a volume that identifies the changes or delta between any two non-consecutive points in time, or more particularly any two non-consecutive snapshots or PITCs, in further embodiments, a delta volume may also be used, and created, as a volume that identifies the changes or delta between any two non-consecutive delta volumes or other logical data structure.

Figure 5:
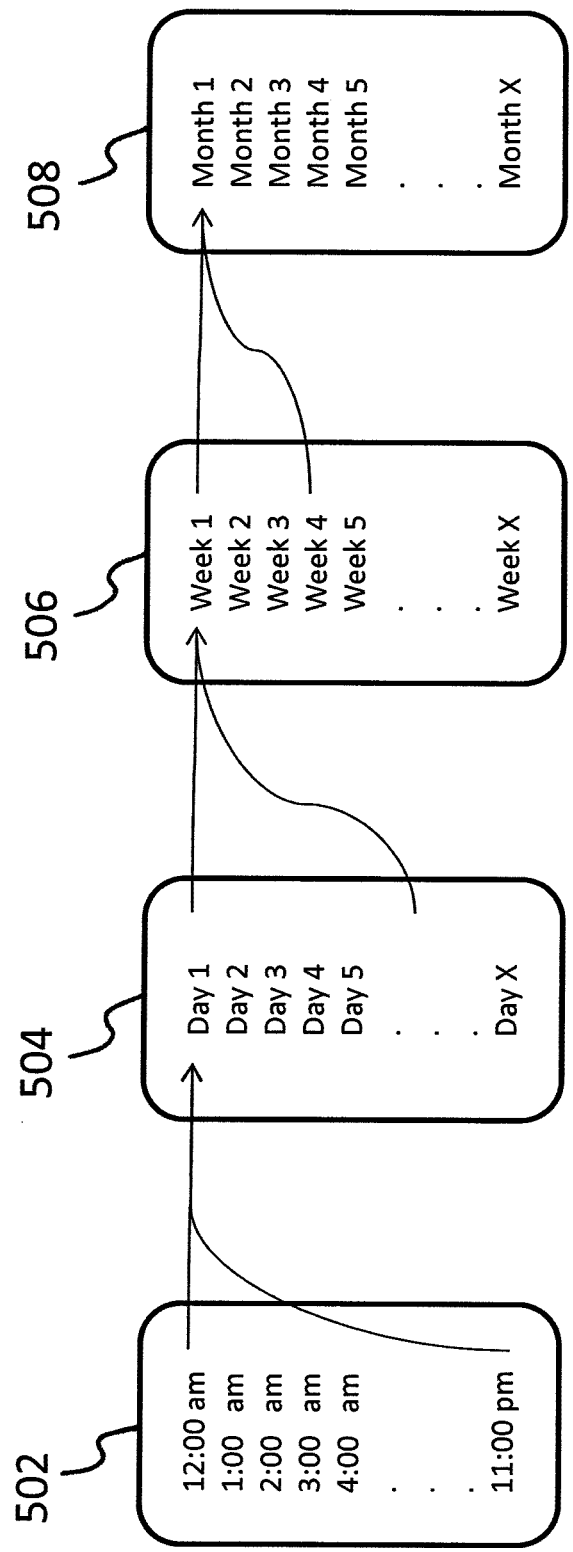
FIG. 5 is a schematic of an example use of replication utilizing delta volumes according to one embodiment of the present disclosure.

As an example of replication utilizing delta volumes and the above features, which is not meant to be limiting and is provided mainly for illustration purposes, in one instance illustrated in FIG. 5, snapshots or PITCs may be taken or committed daily at hourly, bi-hourly, etc. time intervals at a local site 502. In this sense, the local site may keep record, for example, of hourly changes in the data storage system, or selected portions thereof. Being the most recently active data, it may be desirable to keep such frequent backups if, for example, disaster strikes or the data needs to be accessed for testing or other recovery. As time passes, it can become inefficient to store a lot of historical data with active data. Thus, the local site 502 may be configured to keep hourly snapshots or PITCs for only some relatively short period of time, such as but not limited to, 1 day, 2 days, 3 days, 4 days, or more depending, for example, on the desired setup, use, and industry rules and regulations.

Accordingly, a delta volume may be created at the local site 502 and may be configured to identify changes in the data on a daily basis, for example, rather than an hourly basis. More specifically, a day's worth of snapshots at the local site may be copied or coalesced into a delta volume, which would then identify the resulting changes in the data since a point in time 24 hours prior to the creation of the delta volume. The daily delta volumes may be efficiently replicated to another local or a remote site 504, which may keep a replicated copy of the data at the local site 502, but may update the replicated data only on a daily basis based on the daily delta volumes received from the local site. The local site 502 may discard the daily delta volumes once replicated to the remote site 504. In this sense, the remote site 504 may keep record, for example, of daily changes in the data storage system, or selected portions thereof. Likely being less important historical data, it may thus be sufficient to keep less frequent backups at the remote site 504. Nonetheless, as time passes, it may still be inefficient to store large amounts of long-term historical data. Thus, the remote site 504 may be configured to keep daily delta volumes for only a period of time, such as but not limited to, 1 week, 2 weeks, 3 weeks, or more depending, for example, on the desired setup, use, and industry rules and regulations.

In still further embodiments, also illustrated in FIG. 5, delta volumes may further be created at the remote site 504 and may be configured to identify changes in the data on a weekly basis, for example, rather than an hourly or daily basis. More specifically, a week's worth of daily delta volumes at the remote site 504 may be copied or coalesced into a longer term delta volume, which would then identify the resulting changes in the data since a point in time 1 week prior to the creation of the delta volume. The weekly delta volumes may be efficiently replicated to yet another site 506, which may keep a replicated copy of the data at the local 502 and remote 504 sites, but may update the replicated data only on a weekly basis based on the weekly delta volumes received from the remote site 504. The remote site 504 may discard the weekly delta volumes once replicated to site 506. In this sense, site 506 may keep record, for example, of weekly changes in the data storage system, or selected portions thereof. Likely being historical data of even lower importance, it may thus be sufficient to keep even lesser frequent backups at site 506. Nonetheless, as time passes, it may still become inefficient to store large amounts of such historical data. Thus, site 506 may be configured to keep weekly delta volumes for only a period of time, such as but not limited to, 1 month, 2 months, 3 months, or more depending, for example, on the desired setup, use, and industry rules and regulations.

Accordingly, delta volumes may further be created at site 506 and may be configured to identify changes in the data on a monthly basis, for example, rather than an hourly, daily, or weekly basis. More specifically, a month's worth of weekly delta volumes at site 506 may be copied or coalesced into a longer term delta volume, which would then identify the resulting changes in the data since a point in time 1 month prior to the creation of the delta volume. The monthly delta volumes may be replicated to yet another site 508, which may keep a replicated copy of the data at the local 502 and remote 504, 506 sites, but may update the replicated data only on a monthly basis based on the monthly delta volumes received from site 506. Site 506 may discard the monthly delta volumes once replicated to site 508. In this sense, site 508 may keep record, for example, of monthly changes in the data storage system, or selected portions thereof. Because such older historical data is likely to be of low importance, it may be sufficient to keep less frequent backups at site 508. Nonetheless, as time passes, it may still become inefficient to store large amounts of such historical data. Thus, site 508 may be configured to keep monthly delta volumes for only a period of time, such as but not limited to, 1 year, 2 years, 3 years, or more depending, for example, on the desired setup, use, and industry rules and regulations.

The pattern could repeat with larger and larger delta volumes and more local or remote storage sites. Similarly, it need not be the case that the delta volume replication must be chained from site to site growing from smallest delta volume interval to largest delta volume interval in the manner described. For example only, site 508 need not receive monthly delta volumes from only site 506, but could additionally or alternately receive monthly delta volumes from any of sites 502 and 504. Additionally, it is recognized that the above examples are but a few ways in which delta volumes may be utilized, and the various embodiments of the present disclosure are not limited to the examples provided above. It is recognized that delta volumes as described herein, and replication utilizing delta volumes, can have many broad and advantageous uses in a data storage system, and delta volumes need not be used only for replication purposes.

The various embodiments of the present disclosure relating to replication of data utilizing delta volumes provide significant advantages over conventional systems and methods for data replication. For example, the various embodiments of the present disclosure may reduce cost in a variety of ways, including but not limited to: reducing I/O activity between the local storage and the backup or remote storage; reducing total bandwidth use; reducing backup time; and reducing the total amount of storage required at the backup site, for example, by eliminating the need to store temporary intermediate snapshots or PITCs.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

We claim:

1. A method of consolidating data changes in a data storage device in preparation for data replication, the method comprising:
   generating, at spaced time intervals, a plurality of snapshots for a logical data volume of the data storage device, the logical data volume being an abstraction of data blocks from one or more physical storage devices, each snapshot identifying changes of data for at least a portion of the logical data volume since a most previous snapshot;
   generating a plurality of delta volumes, each delta volume indicating changes in the data of at least a portion of the logical data volume between two non-consecutive snapshots;
   transmitting one of the plurality of delta volumes to a second data storage device; and
   generating a combined delta volume, the combined delta volume indicating changes in data of at least a portion of the logical data volume between two non-consecutive delta volumes.

2. The method of claim 1, wherein the spaced time intervals are predetermined time intervals.

3. The method of claim 1, wherein the second data storage device is remotely located from the data storage device.

4. The method of claim 1, wherein the data storage device and second data storage device are part of the same data storage subsystem.

5. The data storage system of claim 1, wherein the combined delta volume is generated at a third data storage device.

6. A method of consolidating data changes in a data storage device in preparation for data replication, the method comprising:
   generating, at spaced time intervals, a plurality of snapshots for a logical data volume of the data storage device, the logical data volume being an abstraction of data blocks from one or more physical storage devices, each snapshot identifying changes of data for at least a portion of the logical data volume since a most previous snapshot;
   generating a plurality of delta volumes at spaced time intervals, each delta volume indicating changes in the data of at least a portion of the logical data volume between two non-consecutive snapshots; and
   generating a combined delta volume, the combined delta volume indicating changes in data of at least a portion of the logical data volume between two non-consecutive delta volumes.

7. The method of claim 6, further comprising generating a plurality of combined delta volumes at spaced time intervals.

8. The method of claim 6, further comprising transmitting the combined delta volume to a second data storage device.

9. The method of claim 6, further comprising transmitting one of the plurality of delta volumes to a second data storage device.

10. A method of data replication from a first data storage device to a second data storage device, the method comprising:
    receiving a plurality of delta volumes at the second data storage device, each delta volume indicating changes in data of at least a portion of a logical data volume of the first data storage device;
    wherein the first data storage device generates a plurality of snapshots for the logical data volume, the logical data volume being an abstraction of data blocks from one or more physical storage devices, each snapshot identifying changes of data for at least a portion of the logical data volume since a most previous snapshot;
    wherein each delta volume indicates changes in data of at least a portion of the logical data volume between two non-consecutive snapshots; and
    generating a combined delta volume, the combined delta volume indicating changes in data of at least a portion of the logical data volume between two non-consecutive delta volumes.

11. The method of claim 10, wherein the snapshots are generated at predetermined time intervals.

12. The method of claim 10, wherein each delta volume is generated at the first data storage device and is discarded at the first data storage device after being sent to the second data storage device.

13. The method of claim 10, further comprising generating a plurality of combined delta volumes at spaced time intervals.

14. The method of claim 10, further comprising replicating the combined delta volume to a third data storage device.

15. The method of claim 10, wherein the second data storage device is remotely located from the first data storage device.

16. The method of claim 10, wherein the first and second data storage devices are part of the same data storage subsystem.

17. The method of claim 10, wherein the combined delta volume is generated at a third data storage device.

18. A data storage system comprising:
    a data storage device generating, at spaced time intervals, a plurality of snapshots for a logical data volume of the first data storage device, the logical data volume being an abstraction of data blocks from one or more physical storage devices, each snapshot identifying changes of data for at least a portion of the logical data volume since a most previous snapshot; and
    a plurality of delta volumes, each delta volume comprising an indication of changes in data between two non-consecutive snapshots of the data storage system, each snapshot identifying changes of data for at least a portion of the data storage system since a most previous snapshot;
    a second data storage device, wherein the plurality of delta volumes are transmitted to the second data storage device; and
    a combined delta volume indicating changes in data of at least a portion of the logical data volume between two non-consecutive delta volumes.

* * * * *